Dec. 31, 1929.  C. I. HALL  1,742,072
DEMAND METER AND RECORDER
Filed Nov. 27, 1925   3 Sheets-Sheet 1

| 176° |
| 274° |
| 071° |
| 007° |
| 145° |
| 204° |
| 171° |

Inventor:
Chester I. Hall.
by
His Attorney.

Dec. 31, 1929.   C. I. HALL   1,742,072
DEMAND METER AND RECORDER
Filed Nov. 27, 1925   3 Sheets-Sheet 2

Inventor:
Chester I. Hall,
by
His Attorney.

Dec. 31, 1929.                C. I. HALL                1,742,072
                       DEMAND METER AND RECORDER
                    Filed Nov. 27, 1925      3 Sheets-Sheet 3
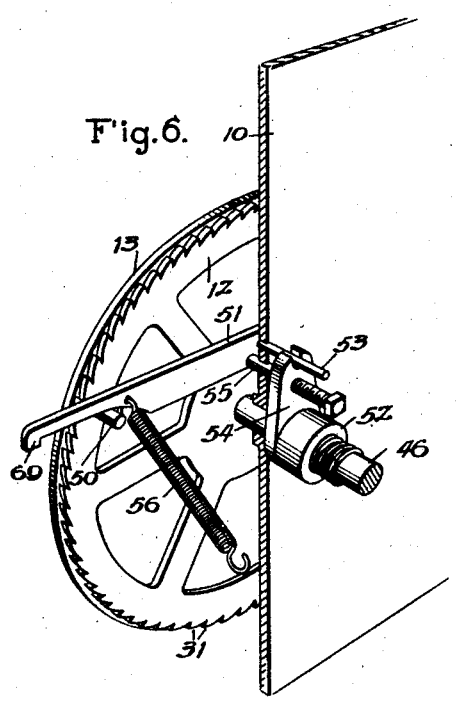
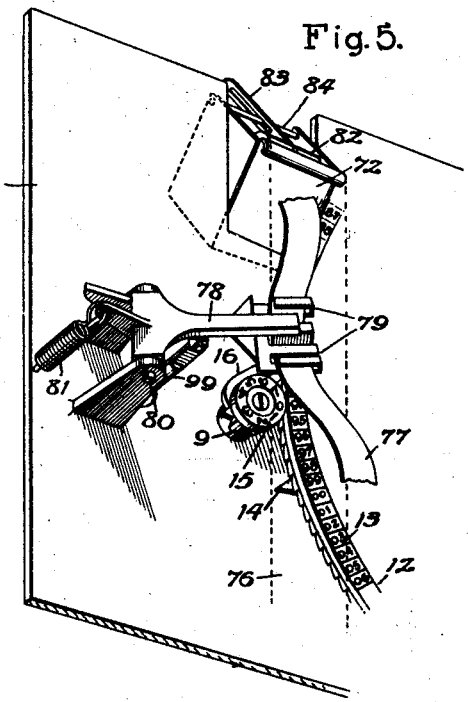
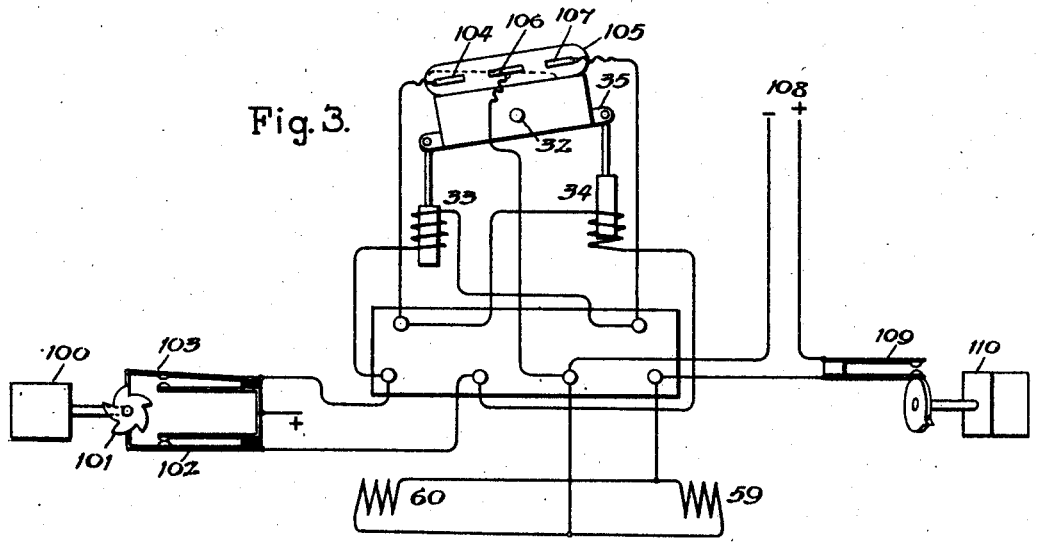
Inventor:
Chester I. Hall,
by
His Attorney.

Patented Dec. 31, 1929

1,742,072

UNITED STATES PATENT OFFICE

CHESTER I. HALL, OF FORT WAYNE, INDIANA, ASSIGNOR TO GENERAL ELECTRIC COMPANY, A CORPORATION OF NEW YORK

DEMAND METER AND RECORDER

Application filed November 27, 1925. Serial No. 71,554.

My invention relates to demand meters and its object is to provide a simple, reliable device of this class which in addition to recording the demands over any number of given time intervals also indicates the demand over any part of a time interval then existing, as well as the maximum demand over a period such as a month and the total kw. hours, or other quantity being metered.

The demand meter is of the relay operated type and may thus be located at any distance from the integrating meter and timing device with which it is associated. The printed record and indications are given directly in the units metered and therefore require no calculations or interpolations to arrive at the exact quantity desired. Various mechanical improvements are employed to obtain accuracy and reliability without complicated mechanisms.

Figures 1, 7:
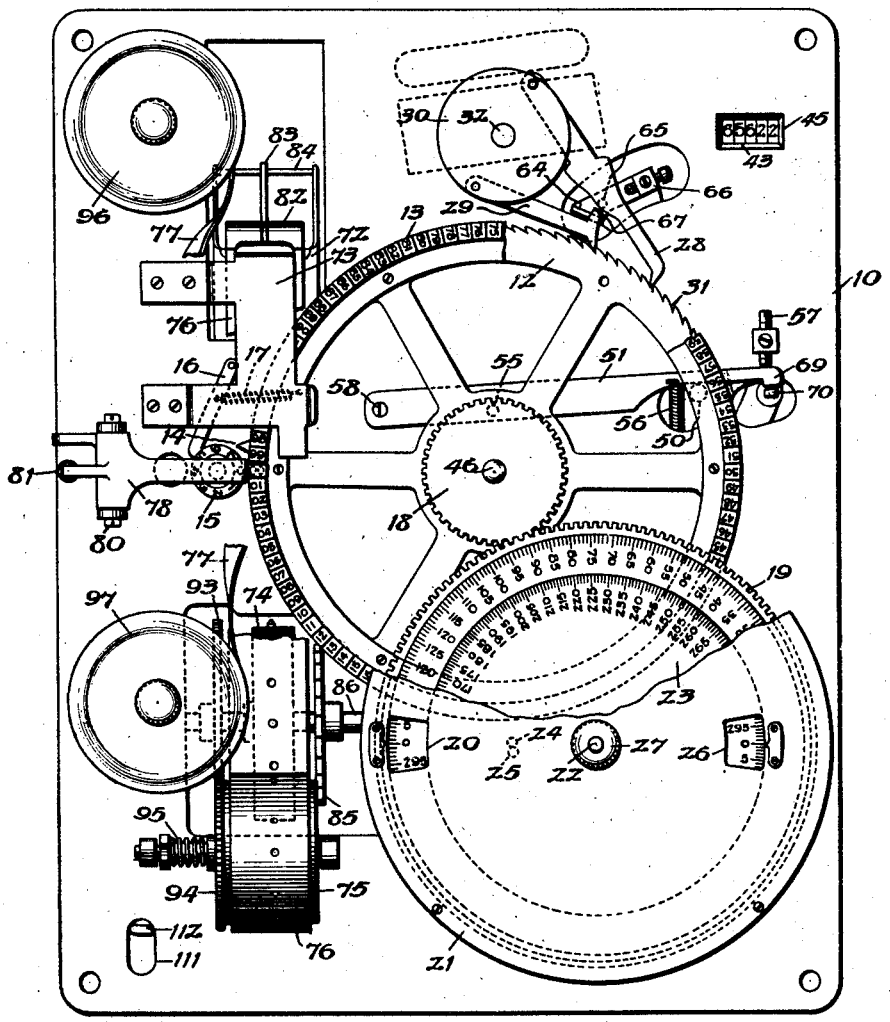
Figure 2:
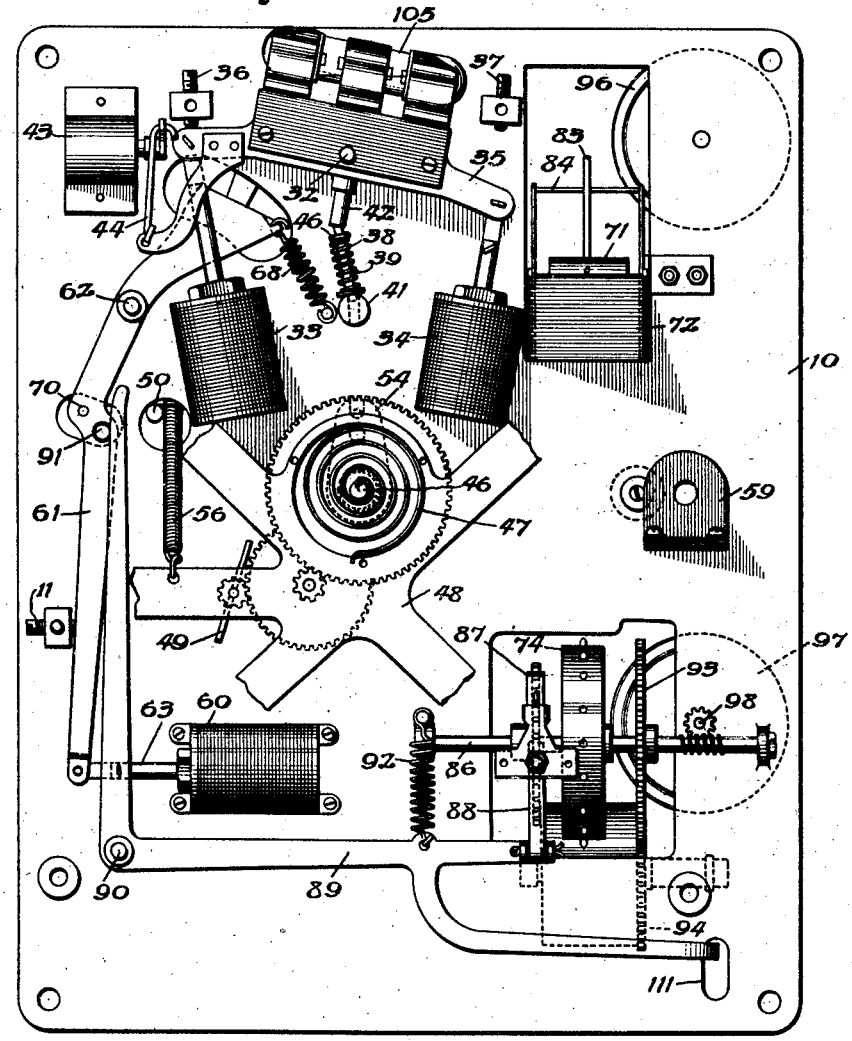
Figure 4:
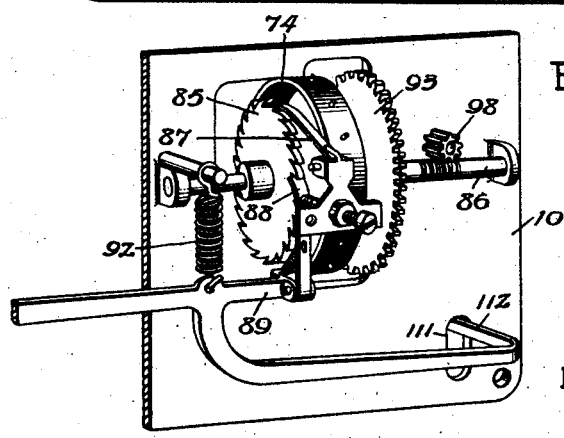

The features of my invention which are believed to be novel and patentable will be pointed out in the claims appended hereto. For a better understanding of my invention reference is made in the following description to the accompanying drawings in which Fig. 1 represents a front view of the meter with certain parts broken away and certain unexposed parts represented in dotted lines; Fig. 2 represents a rear view of the meter showing most of the operating mechanism; Fig. 3 is a wiring diagram for the various operating relays; Fig. 4 is a perspective view of the parts for advancing the record tape and the typing ribbon; Fig. 5 is a perspective view of the printing mechanism; Fig. 6 shows a stop mechanism for the main printing wheel which allows the wheel to be correctly returned to a zero position after being advanced any desired number of revolutions; and Fig. 7 illustrates a portion of the record tape after use.

The complete mechanism is secured to a base plate 10 which may be enclosed in a suitable case, not shown. When this plate is removed from the case all of the operating parts are exposed on its front and rear sides. On the front of the plate are located the printing mechanism and the various indicating devices while the relays and a large part of the operating mechanism are located on the rear of this plate. The main printing wheel 12 carries raised printing type 13 numbered consecutively from 00 to 99 on its front periphery. This wheel carries a single tooth 14 opposite the printing number 99 which when advanced in a clockwise direction past an auxiliary printing wheel 15 meshes with suitable teeth in the hub of wheel 15 as best shown in Fig. 5 to advance wheel 15 the distance of one unit. When the two wheels are in their zero positions the 0 indication on wheel 15 is adjacent the 00 indication on wheel 12. After wheel 12 makes a complete revolution in a clockwise direction tooth 14 advances wheel 15 so that indication 1 thereon takes the position previously occupied by the 0 indication so that the reading now becomes 100 instead of 000. This adjacent position of the two wheels is the printing position as will hereinafter be explained in detail. As wheel 12 is further advanced the numbers opposite the printing position will change to 101, 102, etc., until wheel 12 has been rotated another complete revolution at which time wheel 15 will be advanced another unit and the printing indication will become 200. The present embodiment is designed for a maximum of 300 units and to prevent the wheel 12 from making more than three complete revolutions the hub of wheel 15 is left solid between numerals 2 and 3 thereon, as shown at 9 in Fig. 5. This serves as a stop when tooth 14 comes around the third time. A pivoted finger 16 is held against the teeth in wheel 15 by a spring 17 so as to correctly position and hold the wheel 15 in any one of its various printing positions. When the wheel 12 is rotated in a counter-clockwise direction the reverse operation takes place so that the two wheels are reset to the zero indicating positions together.

Wheel 12 is integral with a gear wheel 18 which meshes with a gear wheel 19 carrying indicating graduations, in this case from 0 to 300. In the present case the gear ratio between 18 and 19 is represented as 3 to 1 so that one revolution of wheel 19 corresponds to three revolutions of main printing wheel 12. When wheel 12 is at its zero printing position as illustrated the zero graduation on wheel 17 is opposite an observation opening at 20, the remainder of the wheel being covered by the plate 21 to avoid confusion. Thus it will be seen that the indication at 20 always corresponds to the printing characters which are in the printing position and gives the present demand at all times during a time interval. Where it is desirable to go above 300 units during a demand interval, the gear ratio between wheels 18 and 19 and the graduations on wheel 19 will be changed accordingly. The shaft 22 on which wheel 19 is freely pivoted supports a dial wheel 23 also graduated with peripheral units, in this case from 0 to 300. A pin 24 in the front of wheel 19 cooperates with a pin 25 in the rear of wheel 23 and constitutes a driving connection between them. Wheel 23 will remain in any position to which it is advanced by pin 24 so that it indicates at the opening 26 the greatest maximum demand which occurred in any time interval since it was last set back to zero, or since it was last set back with pin 25 against pin 24, in case it was set back during a time interval when wheel 19 did not indicate zero. As will be observed, when wheel 19 is in a zero indicating position and the pins 24 and 25 are in contact, as shown, wheel 23 will indicate zero. A knurled thumb piece 27 is suitably secured to wheel 23 to return it with pin 25 against pin 24 at the end of a month, or such other period as desired. It will of course be understood that when wheel 19 is graduated in 400 units and the gear ratio between 18 and 19 is 4 to 1 for example, wheel 23 will also be graduated in 400 units.

The means for advancing the main printing wheel 12 in accordance with the demand comprises a pair of pawls 28 and 29 pivoted on opposite diameters of a wheel 30 and cooperate with ratchet teeth 31 in the outer edge of wheel 12 behind the printing surface 13. In the present case there are 100 such teeth so that the wheel 13 will be advanced one unit's space for each operation of either ratchet. It will be observed that when one ratchet is advanced the other is retracted and will slip over two of the teeth 31.

This operation requires an oscillatory rotary movement of wheel 30 which is effected by a pair of relays on the rear side of the plate for rocking shaft 32 to which wheel 30 is secured. These relays are shown in Figs. 2 and 3 at 33 and 34. A rocker arm 35 is secured to shaft 32 and the movable core pieces of the two relays are pivoted to the opposite ends of this rocker arm. As the relays are alternately energized in the manner hereinafter explained the shaft 32 is oscillated to operate the pawls 28 and 29 to advance the main printing wheel 12. It will be evident that in order to correctly position the printing characters in any possible printing position, the operation of the advancing mechanism must be exact without lost motion. For this purpose the rocker arm 35 cooperates with adjustable stops 36 and 37 to limit its movements and a spring device 38 is provided to complete the movement of arm 35 if necessary and hold it firmly against a stop after it has been moved thereto by the operation of one of the relays. The device 38 is merely one of a number of possible off center spring devices which might be used to produce the desired result. In this case the spring 38 is supported on a pin 39 between a collar 46 on the pin and a stationary abutment 41. The upper end of the pin fits into the cupped end of a post 42 rigidly extending from rocker arm 35 at right angles to shaft 32 and the lower end of the pin 39 is free to slide through an opening in the abutment 41. It will be seen that as the rocker arm 35 moves through a horizontal position, spring 38 is compressed and as the movement passes beyond the central horizontal position there is a snap action as the spring expands again urging the arm 35 against its stop. The rocker arm 35 also operates a cyclometer type totalizing counter 43 through the operating connection shown at 44. The reading of this counter is exposed from the front of the plate through an opening 45. The main printing wheel is mounted on a shaft 46 extending through the plate 10 and as the wheel is advanced it winds up a return spring 47 secured between the shaft 46 and a stationary framework 48 suitably fastened to the back of the plate to assist in supporting the various operating parts of the device. In order to damp the intermittent movement of the printing wheel as it is advanced and to prevent excessive speed when it is returned to zero a fan brake 49 is geared to shaft 46. It will be observed that the advancing pawls 28 and 29 also serve to maintain the wheel 12 in the advanced position against the action of spring 47 and since these pawls are positioned with exactness in their extreme positions by their operating mechanism the type wheel will always be advanced a distance of exactly one unit for each operation and when stationary will have one of its printing characters correctly positioned for printing.

On the rear of the main printing wheel is a pin 50 which comes against the lower side of an arm 51 as the wheel is returned to a zero position to stop the wheel in the zero position represented. If the wheel 12 is to be advanced more than one revolution, it will be necessary to remove the arm from the path of pin 50 during the time said pin is being advanced in a clockwise direction past this point. The parts best shown in Fig. 6 are provided for this purpose. On shaft 46 is a nut 52 held against rotation with shaft 46 by a pin 53 secured in plate 10 and slidably inserted in a slot in an arm 54 integral with the nut 52. Rigidly but adjustably secured in arm 54 is a pin 55 which is free to slide through an opening in plate 10 against arm 51. Arm 51 is held against the end of pin 55 by a spring 56. It will now be seen that when wheel 12 and shaft 46 are rotated to advance the type wheel, nut 52 will be moved away from plate 10 and spring 56 will keep arm 51 against the end of pin 55. The parts move a sufficient distance during one revolution of shaft 46 for stop pin 50 to clear arm 51 after it has been advanced one revolution from the zero position shown. However as the wheel is returned toward a zero position arm 51 will move back into the position shown during the last revolution of wheel 12, so as to correctly stop the wheel at the zero position. This zero position is adjusted to exactness by a stop screw 57 on the front side of the plate just above arm 51. The other end of arm 51 is loosely pivoted at 58 and serves, in addition to the function just described, to hold the ratchet pawls 28 and 29 away from the ratchet wheel during the backward rotation of the printing wheel 12.

At the end of a time interval a time controlled circuit energizes a printing solenoid 59 and a solenoid 60 for releasing the type wheel 12 so that it may return to a zero position. The last mentioned function is accomplished by a lever 61 pivoted at 62 and secured at its lower end to the plunger 63 of solenoid 60. The upper end of lever 61 has parts 64, 65 and 66 extending at right angles through an opening in plate 10 and loosely embraces the two pawls 28 and 29. Pawl 29 has a part 67 which extends to the rear between parts 64 and 65. When the pawls are in operative engagement with wheel 12 the parts 64, 65 and 66 serve to guide the pawls and prevent them from operating ineffectually. This position of lever 61 is normally maintained against an adjustable stop 11 by a spring 68. When solenoid 60 is energized plunger 63 will be drawn into the coil and lever 61 will be rotated about pivot 62 against the tension of spring 68. With this movement part 64 raises pawl 29 and with it pawl 28 from engagement with wheel 12 releasing the wheel and allowing it to return to zero. To assure that the pawls will not be reengaged with wheel 12 before the wheel has completed its return to zero the hooked end 69 of arm 51 is arranged to drop down and engage a latch 70 extending through wall 10 from lever 61 so as to hold the lever 61 in the releasing position until wheel 12 has actually returned to zero. The spring 56 pulls arm 51 downward as well as rearward so that as soon as wheel 12 starts to advance from a zero position, arm 51 will drop down with latch 69 on pin 70. Then at the end of the demand interval when lever 61 is moved to release the pawls 28 and 29 latch 70 will be moved to the left, as viewed in Fig. 1, behind the hook 69 allowing the hook to drop down into engaging position. The lever 61 is therefore held by this means until pin 50 raises arm 51 against stop pin 57 as it returns to the zero position. Latch 70 is released and the pawls 28 and 29 again drop down into their operative positions.

The apparatus for printing the record will now be described. A recording tape 76 is arranged to be fed from a roll 71 loosely contained in a chute 72, through a guide 73, past and in front of the recording position of the type wheels, past a driving wheel 74 having projections for engaging holes in the tape, and around a winding-up drum 75. In Fig. 1 the recording tape is broken away so as to expose the printing wheels and in Fig. 5 the outline of the tape is represented in dotted lines for the same reason. In order for the record to be printed on the front of the tape a carbon or ink ribbon 77 is used and is tapped against the tape at the printing position by a suitable printing member 78 whenever a record is to be printed. The ribbon 77 is threaded through suitable fingers 79 carried by the printing member 78 which is pivoted at 80 and is normally swung away from and to one side of the printing position as represented in Fig. 5 by a spring 81. When the printing member 78 swings away from the printing position it carries with it the carbon ribbon so that a number of the printed records are exposed to view. Thus an observer may see all of the printed records above the roll 76 without removing or unrolling the printing tape. A section of the printed record tape is shown in Fig. 7. The proper tension is maintained on the tape 76 by means of a weighted roller 82 in the chute 72. The roller is maintained in proper position by a slotted tongue 83 through which a retaining pin 84 is passed.

The drive wheel 74 for the printing tape is driven by means of a ratchet and pawl device best shown in Figs. 2 and 4. The ratchet wheel 85 is mounted on the shaft 86 with the printing tape drive wheel 74. The ratchet wheel is held from backward rotation by a pawl 87 and is advanced by a pawl 88 pivotally mounted on a lever arm 89. This lever arm is pivoted at 90 and extends up at right angles adjacent an operating pin 91 on the lever 61 which is operated by the timing solenoid 60. Lever 89 is maintained against pin 91 by means of the spring 92. When solenoid 60 is energized pin 91 moves to the right as viewed in Fig. 2. This retracts the pawl 88 and then when lever 61 is released after the printing wheel has returned to a zero position spring 92 moves lever 89 in a counter-clockwise direction to advance the shaft 86 and the drive wheel 74 a short distance sufficient to properly space the printed indications on the recording tape. On shaft 86 is a gear wheel 93 which meshes with a gear 94 (see Fig. 1). Gear 94 is connected to the shaft of the winding-up spool 75 through a friction clutch comprising a spring 95 compressed between wheel 94 and a collar on the shaft of spool 75. In this way the printing tape is advanced and wound up in the required manner, the friction clutch allowing for the variation in diameter of the roll 76 as it is wound up.

The carbon printing ribbon 77 is fed from a spool 96 through the fingers 79 on the printing member to a spool 97. The shaft 98 of spool 97 is worm geared to the shaft 86 and the carbon ribbon is advanced with the printing tape, but at a much slower rate. This assures that the carbon ribbon under the printing member will be changed after each printing operation and that the printing will be clear.

The printing member 78 is operated by the solenoid 59, the plunger 99 of the solenoid being secured to the back side of the printing member 78 by a link as shown in Fig. 5. As was hereinbefore pointed out solenoids 59 and 60 are connected in parallel and are therefore energized at the same time. However, solenoid 59 is quick acting as compared to solenoid 60 and the parts moved thereby have less inertia than the parts moved by solenoid 60 so that the printing operation is completed before the type wheel 12 is released and starts to return to a zero position. Furthermore the operation of solenoid 59 is such that immediately after the printing member 78 strikes to perform the printing operation spring 81 immediately pulls the printing member back slightly so that even though the solenoid remains energized the printing wheel is free to return to a zero position without rubbing against the recording tape. The printing member 78 acts with a quick snap action so as to strike a sharp blow similar to that of a typewriter key.

The wiring diagram for the various relays is shown in Fig. 3. In this figure 100 represents an integrating meter, for example a watthour meter. It drives a contactor cam 101 for alternately operating arms 102 and 103 of a pair of contactors. The inner contacts of the contactors are connected to one side of a suitable source of supply marked +. The circuit closed by contactor 102 contains the coil of solenoid 34 and the contact 104 of a double throw mercury switch 105, the central electrode 106 of which is connected to the other side of the source of supply marked −. It will be observed that the mercury tube switch 105 is mounted on the rocker arm 35 connecting the plungers of the two solenoids 33 and 34 so that said switch is operated by these solenoids and serves to open a solenoid circuit immediately after its operation and close the circuit of the other solenoid at this point.

As shown in Fig. 3 the circuit of solenoid 34 is closed. It will operate to tip rocker arm 34 in the other direction opening the circuit of solenoid 34 between contacts 104 and 106 and closing the circuit of solenoid 33 between contacts 106 and 107. The circuit of solenoid 33 is open at 103 but will be closed as the meter 100 rotates. It is thus seen that the oscillation of rocker arm 35 is proportional to the rate of the meter 100 so that the advancement of the various indicating and printing wheels of the demand meter will be proportional to the rate of the meter 100. The mercury tube switch is not essential but is desirable to cut down the consumption of electricity which might amount to considerable if the watthour meter 100 should stop with one of the contacts 102 and 103 closed. The opening of the solenoid circuits immediately after their operation also leaves the rocker arm 35 entirely free to be correctly positioned by its positioning means previously described. The circuits of the printing solenoid 59 and the type wheel releasing solenoid 60 are connected in parallel to a source of supply 108 through a time controlled contactor 109 arranged to be closed by a timing motor 110 at predetermined intervals, such for example as every 15 minutes, or every half hour.

The various operations of the demand meter will now be reviewed in the order in which they occur taking the zero position represented in Fig. 1 as the starting point. As the meter 100 operates contactors 102 and 103 will be alternately energized and rocker arm 35, shaft 32 and wheel 30 will be oscillated so that the ratchet pawls 28 and 29 will be alternately advanced and retracted to rotate wheel 12 in a clockwise direction. This winds up spring 47. As soon as wheel 12 starts to move, pin 50 allows arm 51 to drop down with hook 69 against latch 70. The totalizing counter 43 is operated for each complete oscillation of the rocker arm 35. The present demand wheel 19 and the maximum demand wheel 23 are rotated in a counter-clockwise direction. During the first revolution of wheel 12, pin 55 is withdrawn by nut 52 to allow arm 51 to be drawn back by spring 56 a sufficient distance for pin 50 on wheel 12 to clear arm 51 as it passes adjacent the arm near the end of the first complete revolution of wheel 12. As wheel 12 completes its first revolution, tooth 14 engages one of the teeth in the hub of printing wheel 15 and advances said wheel one unit so that numeral 1 on said wheel is rotated into printing position. The movement of wheel 12 and the parts driven thereby continue until the end of the demand interval. Let us assume that the printing indication is 274 at this time. The indications at 20 and 26 will therefore read 274. When the time controlled circuit is closed the first thing that happens is the operation of the printing device which prints 274 on the printing tape and then moves slightly away from the printing wheels. Then solenoid 60 operates. Pawls 28 and 29 are raised, arm 51 drops down behind latch 70 so as to retain lever 61 in the position to which it has just been moved by solenoid 60, lever 89 is moved to retract pawl 88 of the mechanism for advancing the printing tape and wheel 12 starts to return to zero. Wheel 19 is returned to a zero indicating position with wheel 12 but wheel 23 remains in the position to which it was last moved and indicates 274. Printing wheel 15 is moved back one unit each time tooth 14 passes this point. During the last revolution pin 58 moves arm 51 out into the path of stop pin 50 so that wheel 12 is brought to a stop in its initial zero position. As pin 50 strikes arm 51 it moves the arm up against the zero stop 57 and releases latch 70. Spring 68 thereupon pulls lever 61 back to its original position allowing pawls 28 and 29 to drop down into engagement with wheel 12. Spring 92 returns lever 89 to its original position and pawl 87 rotates shaft 86. The printing tape and carbon ribbon are advanced thereby as previously described. The time controlled circuit is only energized momentarily and as soon as it is deenergized the printing member 78 swings back so that the characters printed on the tape are readily seen. Should it happen that one or more contacts are made by the meter 100 during the few seconds that the pawls 28 and 29 are raised from the wheel 12 the totalizing counter 43 is nevertheless operated and correctly registers the total kw. hours measured by the watthour meter 100. If during subsequent time intervals the demand exceeds 274, wheel 23 will be advanced accordingly; otherwise it will remain stationary until reset by hand.

It will sometimes be desirable to remove the recorded portion of the printing tape at the end of a month, or week, for use in making up the customer's bill. To facilitate the advancement of the tape independently of the rest of the demand meter operation, the lever 89 is extended and passed at right angles through an opening 111 in plate 10 and terminates in a manually operable thumb piece 112 in front of plate 10. Alternately pressing and releasing this thumb piece operates the tape advancing means independently of the remainder of the demand meter mechanisms. The record tape may be simply torn off above the last record and removed from the spool 75. Then the end of the unused tape is threaded over wheel 74 and manually advanced a short distance until it has started to properly roll up on spool 75. It will be observed that the printed records on the tape are made at equal time intervals apart so that the time at which one such record was made determines the time of the rest of the records. Thus when the record is removed the time of the last record may be noted thereon and the maximum record may be noted from observing the indication at 26 without having to make a special search. If the record is made every 15 minutes and one inch of tape contains four records, the determination of the exact time of any record in several feet of tape becomes simply a matter of measurement. If desired, time indications may be printed on the tape before use. Where watthours are measured, as has been assumed in this description, one watthour meter contact may be easily arranged to represent one watthour of metered energy so that the various indications and the printed record will be given directly in watthours. Where the counter 43 is of the usual type, its reading should be multiplied by 2, since as represented it receives only one forward actuating movement for each complete oscillation of the rocker arm 35.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In a demand meter having a printing wheel arranged to be advanced from a zero position over predetermined time intervals in accordance with the demand to be measured, means for printing the demands at the end of the time intervals, and means for causing the return of the demand measuring printing wheel to zero at the ends of such time intervals, separate relays arranged to be energized simultaneously for actuating both of said means, the relay actuating the printing means being quicker acting than the other relay, whereby the printing is accomplished before the printing wheels start to return to a zero position.

2. In a demand meter having printing characters adapted to be brought into a printing position in accordance with the demand, a record tape arranged to be advanced past the printing position in front of said printing characters, a movable printing member pivotally mounted at one side of the tape adjacent the printing position, a printing ribbon carried by said printing member between it and the front of said record tape, means for tapping said printing member, printing ribbon and record tape against the printing characters which are in the printing position at predetermined intervals, and means for moving said printing member and printing tape away from and to one side of said record tape so as to normally expose said tape to view.

3. In a recording demand meter having a type wheel arranged to be advanced more than one complete revolution in accordance with the demand to be recorded, a zero stop for said type wheel, means for returning said wheel to a zero position against said stop at the end of a demand interval, and means operated by the movement of said type wheel for removing the zero stop from its stopping position during the first advaning revolution of said type wheel and returning it to its stopping position during the last returning revolution of said type wheel.

4. In a recording demand meter having a type wheel arranged to be advanced from a zero position more than one complete revolution in accordance with the demand to be recorded, means for rotating said wheel in the opposite direction at the end of a demand interval, a zero stop for said wheel, and means for rendering said stop ineffective to stop said wheel in any position other than its initial zero rotative position.

5. In a recording demand meter having a type wheel arranged to be advanced more than one complete revolution from a zero position in accordance with the demand to be recorded, a shaft to which said wheel is secured, a nut threaded on said shaft, means for preventing the nut from rotating with said shaft, a zero stop for said type wheel, and means operated by the movement of said nut along said shaft during the first revolution of said type wheel from a zero position for removing said zero stop from its stopping position, whereby the wheel is free to rotate more than one complete revolution from and return to its zero position.

6. In a demand meter, a ratchet wheel arranged to be advanced from a zero position in accordance with the demand to be measured, means for returning said wheel to a zero position, a pawl for normally holding said wheel from returning to zero, time controlled means for lifting said pawl from said wheel so that it may return to zero, a movable zero stop member for said wheel adapted to assume a position for retaining said pawl in the lifted position while said wheel is returning to zero but to be moved to release said pawl by the stopping operation.

7. In a demand meter, a ratchet wheel arranged to be advanced from a zero position in accordance with the demand to be measured, means for returning said wheel to a zero position, a pair of pawls for advancing said wheel and for normally retaining it in the advanced position, time controlled means for removing said pawls from the ratchet wheel so that it may return to zero, a movable member serving in one position as a zero stop for said ratchet wheel, and in a second position to prevent said pawls from engaging said ratchet wheel, said member being arranged to move into the second mentioned position as soon as said pawls are removed from the ratchet wheel and to be moved into the first mentioned position by the stopping operation.

8. In a demand meter a ratchet wheel arranged to be advanced from a zero position more than a complete revolution in accordance with the demand to be measured, means for returning said wheel to a zero position, a pawl for normally holding said wheel from returning to zero, time controlled means for removing said pawl from the ratchet wheel so that it may return to zero, a zero stop bar for said wheel arranged to lock said pawl away from said wheel while said wheel is being returned to a zero position, but to release said pawl when said bar stops said wheel in the zero position, and means for rendering said bar inoperative to stop said wheel until it has been returned the same angular distance that it was advanced from its initial zero position.

In witness whereof, I have hereunto set my hand this 21 day of Nov., 1925.

CHESTER I. HALL.